United States Patent [19]

Siegal

[11] Patent Number: 4,771,204
[45] Date of Patent: Sep. 13, 1988

[54] SEALING METHOD AND MEANS FOR FLUID CONTROL DEVICE

[75] Inventor: Burton L. Siegal, Skokie, Ill.

[73] Assignee: Kiwi Coders Corporation, Wheeling, Ill.

[21] Appl. No.: 79,585

[22] Filed: Jul. 30, 1987

[51] Int. Cl.$^4$ ............................................. H01L 41/08
[52] U.S. Cl. ..................................... 310/330; 310/332; 310/328; 137/831; 251/129.01
[58] Field of Search .................................. 310/330–332, 310/378, 800; 251/129.01, 129.06, 291, 335.1, 335.2; 116/DIG. 9; 137/831, 837

[56] References Cited

U.S. PATENT DOCUMENTS

| | | | |
|---|---|---|---|
| 3,935,485 | 1/1976 | Yoshida et al. | 310/800 X |
| 4,403,382 | 9/1983 | Facoetti et al. | 310/800 X |
| 4,413,202 | 11/1983 | Krempl et al. | 310/800 X |
| 4,450,375 | 5/1984 | Siegal | 310/332 X |
| 4,629,926 | 12/1986 | Siegal | 310/331 |

Primary Examiner—Mark O. Budd
Attorney, Agent, or Firm—Silverman, Cass, Singer & Winburn, Ltd.

[57] ABSTRACT

In a membrane valve fluid flow control device which includes a pair of superimposed surfaces wherein the membrane is interposed between the surfaces under compression and further serves as a seal. A raised rib portion is provided to impact limited areas of the membrane and localize compression along a narrow band apart from and surrounding valve chambers and any associated openings through the surface. The raised rib portion will localize compression forces along a narrow band on the membrane and limit lateral flow of the membrane material to prevent thickening or bulging of the material over the valve seat area.

27 Claims, 2 Drawing Sheets

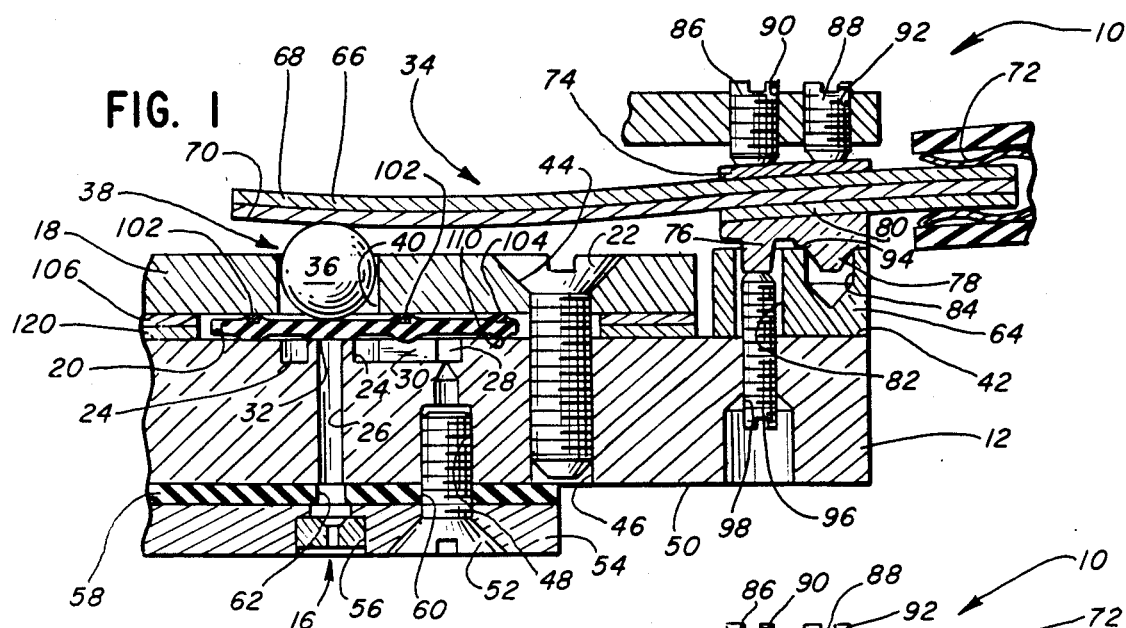
FIG. 1
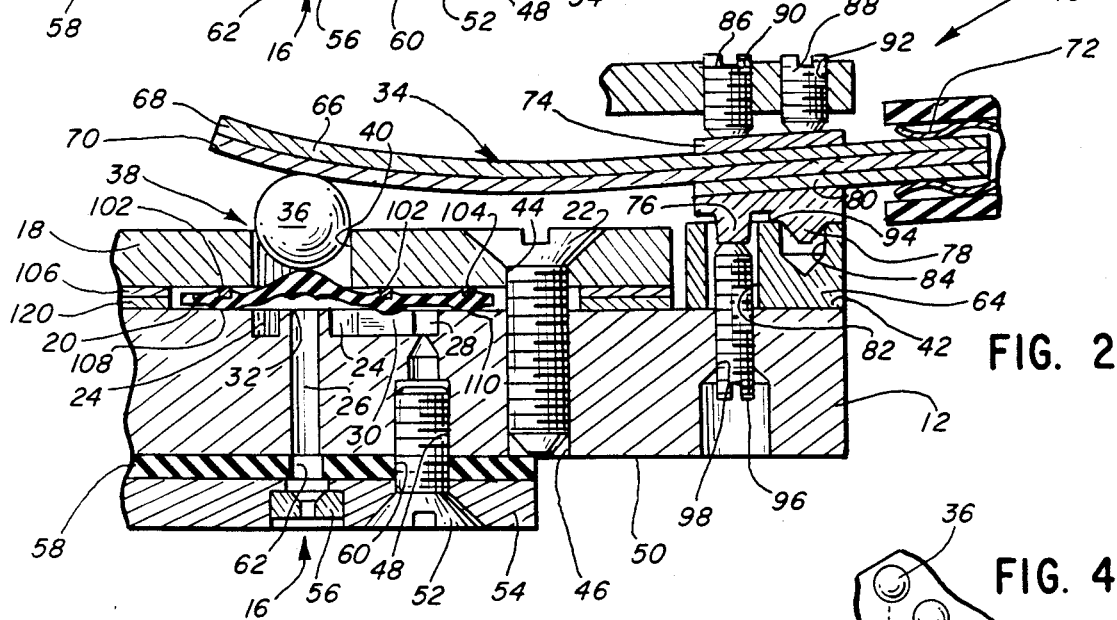
FIG. 2
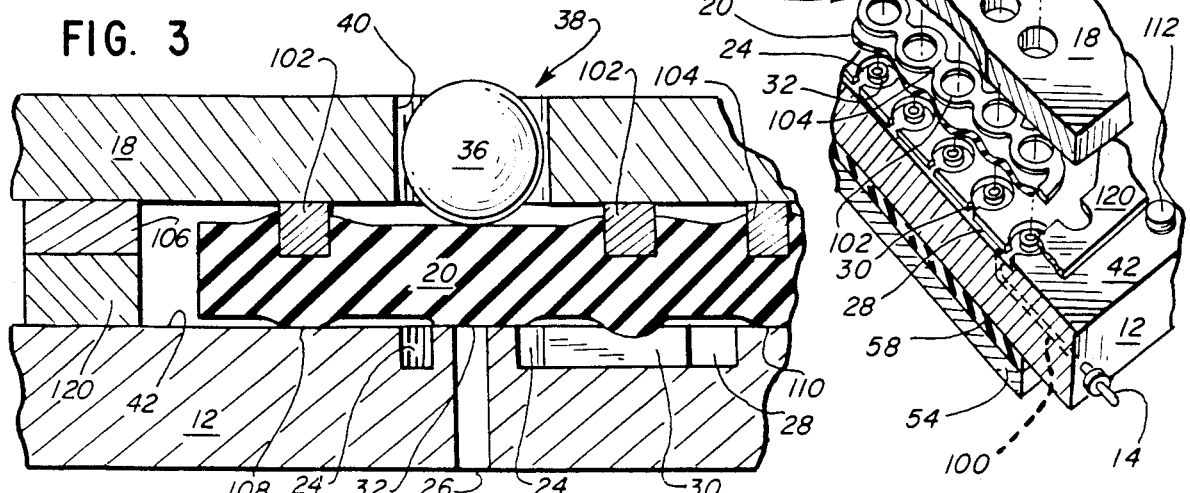
FIG. 3
FIG. 4

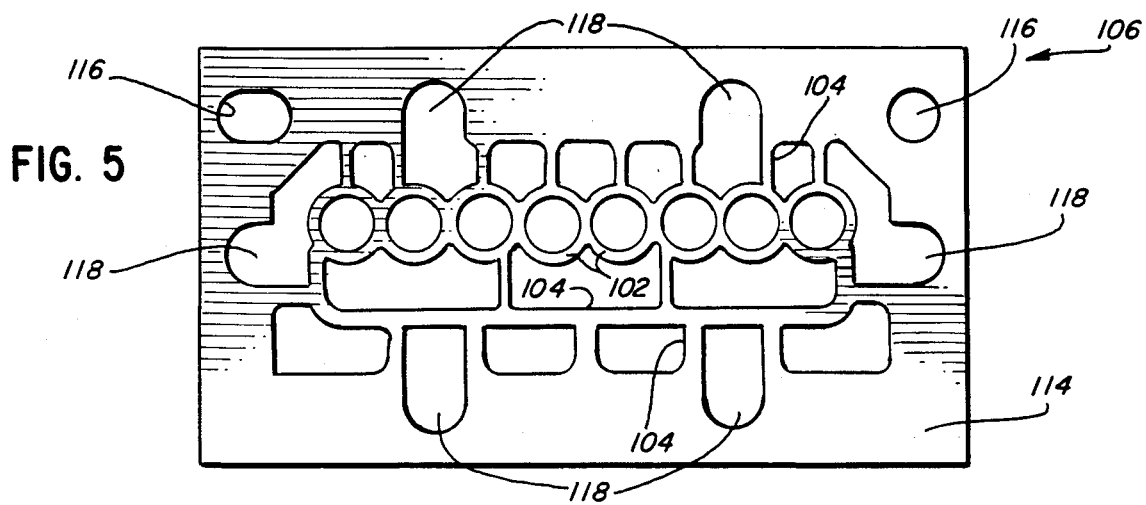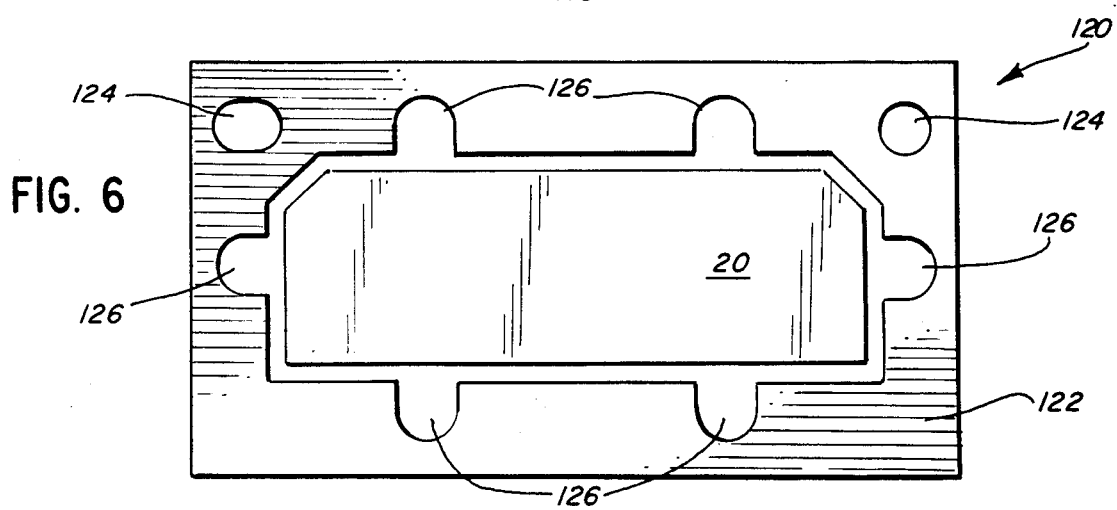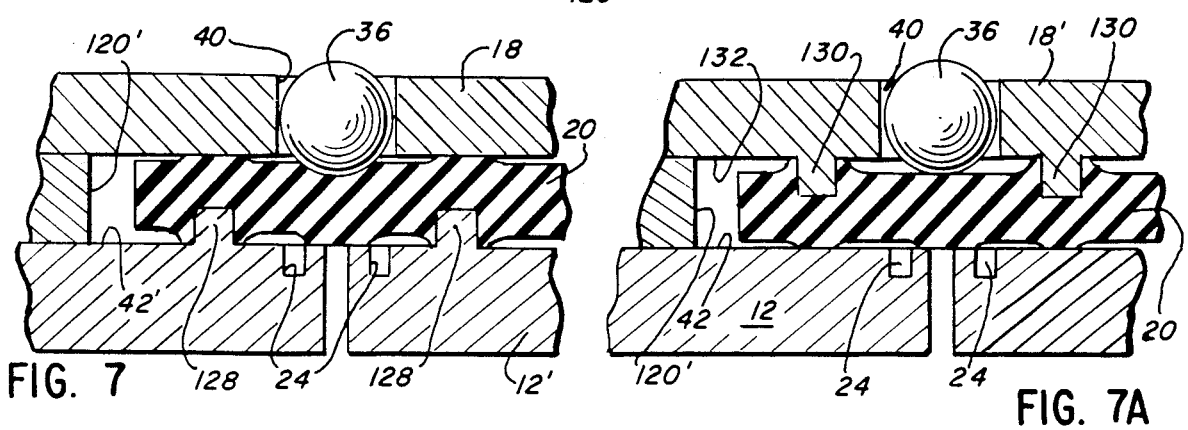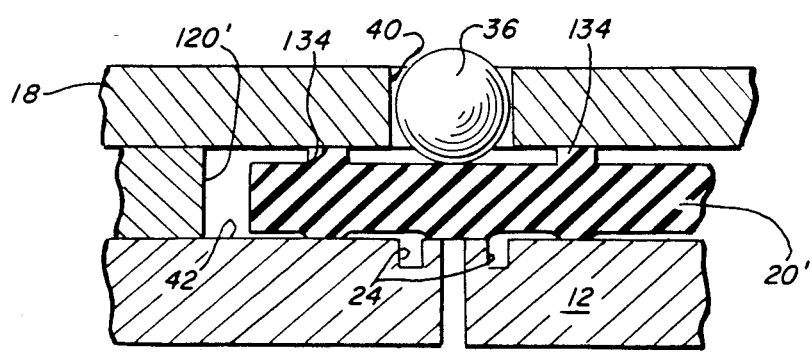

SEALING METHOD AND MEANS FOR FLUID CONTROL DEVICE

BACKGROUND OF THE INVENTION

The invention relates generally to fluid flow control devices having a membrane valve and more particularly to an improved structure for restricting flow of the resilient membrane material under compression.

The invention is adapted for use in fluid control devices of the type herein described or as disclosed in U.S. Pat. Nos. 4,450,375 and 4,629,926.

These fluid flow devices include at least one cantilever mounted piezoelectrically operated actuator or bender which cooperates with an associated impacting member to cover and/or uncover a valve seat by deforming a resilient membrane. The valve seat is centered in a chamber and the impacting member and its associated bender is isolated from the fluid flow by the resilient membrane. The membrane is formed conventionally of a rubber or rubber-like material. The valve cover and valve housing are fastened together with the membrane under compression and the fluids dispensed are under pressure. Under these conditions, the membrane material tends to flow laterally between the assembled components. This leads to a thinning of the membrane and a flowing thereof over the valve seat area. The resulting thickening or bulging of the membrane material over the valve seat area increases the amount of force that is required to perform the valving function which results in a reduction in the efficiency of the fluid control device.

Accordingly, a need has arisen to reduce, if not eliminate, the deleterious effects of the aforementioned lateral displacement of the membrane.

Additionally, the membrane serves to seal the chamber and any associated grooves or channels opening through the adjacent surface. Conventionally, the membrane is simply allowed to compress between the valve cove and valve body wherein the entire membrane acts in the sealing capacity. This relatively large area of contact results in a substantial likelihood of leakage and increases the cubic volume of the membrane displaced for a given amount of compression. The present invention localizes the compressing forces to form a sealing engagement along a narrow band surrounding the areas to be sealed. Thus, the cubic volume of membrane displaced for a given amount of compression is kept to a minimum while, at the same time, functioning to seal the chamber and any associated openings.

SUMMARY OF THE INVENTION

The present invention provides a raised rib portion within a membrane valve fluid flow control device wherein the membrane is under compression and also serves as a seal. The raised rib portion is positioned on the membrane to seal valve chambers and any associated channels or openings on the surface. Thus placed, the rib portion will localize compression forces along a narrow band on the membrane and limit lateral flow of the membrane material over the valve.

BRIEF DESCRIPTION OF THE DRAWINGS

FIG. 1 is a fragmentary sectional view of a fluid control device illustrated with the invention installed therein, the device being of the normally closed type;

FIG. 2 is a fragmentary sectional view of a fluid control device illustrated with the invention installed therein, the device being of the normally open type;

FIG. 3 is a fragmentary diagrammatic view of the fluid control device of FIG. 1 illustrating the operation of the invention when the components are assembled under compression;

FIG. 4 is a fragmentary exploded perspective of the fluid control device of FIG. 1 illustrating the arrangement of the chambers and the valve seats therein;

FIG. 5 is a plan view of a gasket screen of one embodiment of the invention to be seated on the sealing membrane of the fluid control device;

FIG. 6 is a plan view of a gasket shim shown spaced apart from the sealing membrane;

FIG. 7 is a diagrammatic fragmentary view illustrating a modified embodiment of the invention;

FIG. 7A is a diagrammatic fragmentary view illustrating another modified embodiment of the invention; and FIG. 7B is a diagrammatic fragmentary view illustrating a further modified embodiment of the invention.

DESCRIPTION OF THE PREFERRED EMBODIMENTS

Referring to FIG. 1, there is illustrated a fluid control device identified generally by the reference character 10. The device 10 provides for high speed operations with accurate and precise opening and closing times. The piezoeleotrio mechanism provides high speed operation and accuracy to actuate the device 10 without being in contact with the fluid. The fluid being treated is under pressure and the device 10 is assembled with the membrane under compression.

The fluid control device 10 includes a housing 12. Fluid enters the housing 12 through a fluid inlet port 14 (best seen in FIG. 4) and exits the housing through a fluid outlet port 16 (best seen in FIGS. 1 and 2). The housing 12 has a cover plate 18 with a sealing membrane 20 of resilient rubber or rubber-like material interposed therebetween. The housing 12 and the cover plate 18 are secured together by mounting screws 22. A chamber 24 communicates to the outlet port 16 through an outlet channel 26. As best seen in FIG. 4, fluid is allowed to pass between chambers through a channel 28 and a connecting channel 30. When the sealing membrane 20 is forced against a valve seat 32, as seen in FIG. 1, the fluid flow will be stopped at the chamber 24. However, when the sealing membrane 20 is allowed to move away from the valve seat 32, as seen in FIG. 2 the fluid under pressure will force the membrane 20 away from the valve seat 32 such that fluid can pass to the outlet channel 26 to exit the device 10 through the fluid outlet port 16. In other words, fluid will be allowed to flow through the device 10.

In the illustrated embodiment, the device 10 further includes a piezoelectric actuator or bender 34, an impacting structure 36 for stopping and starting the flow of fluid through the device 10 by alternately forcing the membrane 20 against the valve seat 32 and releasing the membrane 20. The impacting structure 36 is slidably situated in an opening 38 defined by a wall 40 in the cover plate 18. The impacting structure 36 is not restricted to a specific shape or dimension. However, the impacting structure 36 must be configured to move within the opening 38 to force the membrane 20 against the valve seat 32 when it is desired to stop the flow of fluid and to release the membrane when the flow is to resume. Therefore, the impacting structure 36 can be spherical, as shown, or of polyhedral or cylindrical configuration having spherical top and bottom surfaces. Additionally, the impacting structure 36 and the actuator 34 are seen to be isolated from the fluid by the sealing membrane 20 thus, avoiding the damage that can result from an interaction between the fluid and the moving parts.

The sealing membrane 20 functions as the valving element for the fluid control device 10 and is common to all of the chambers 24, valve seats 32 and channels 28 and 30 of the fluid control device 10. The membrane 20 is a strong, pliable sheet member and can be formed of a resilient rubber or rubber-like material. The material for the membrane 20 is selected on the basis of abrasion resistance and chemical compatibility with the fluid as well as its elasticity and resilience characteristics. The membrane 20 is thin, for example 0.009 inches, and is secured on a housing surface 42 of the housing 12 for resilient movement vertically over the valve seat 32 for the opening and/or closing thereof in fulfilling its valving function. When the device 10 is assembled, the membrane 20 is placed under compression between the housing 12 and the cover plate 18.

The cover plate 18 is provided with an opening 44 adapted to be aligned with a threaded passage 46 formed in the housing 12. The mounting screw 22 is used to secure the cover plate 18 and the housing 12 together by means of the threaded passage 46. The use of the mounting screw 22 supplies a convenient means of exchanging or replacing the membrane 20, should such replacement become necessary.

In FIGS. 1 and 2, a threaded socket 48 is shown to open through a lower surface 50 of the housing 12 to receive a mounting screw 52 for coupling a nozzle plate 54 thereto. The nozzle plate 54 is provided with a nozzle 56. A gasket 58 is sandwiched between the housing 12 and the nozzle plate 54 to form a seal therebetween. The gasket 58 includes a passageway 60 to permit mounting screw 52 to pass therethrough and a passageway 62 in alignment with the outlet channel 26 to permit the passage of fluid therethrough. The nozzle plate 54 can be easily and conveniently removed to clean or repair the nozzle 56. Additionally, a new nozzle can be quickly supplied by replacing the nozzle plate itself.

The piezoelectric bender 34 is arranged in a generally horizontal plane cantilever to a spacer plate 64 with a free end 66 extending horizontally past the impacting structure 36. Each piezoelectric bender 34 is formed of two layers 68 and 70 superimposed and bonded together. One layer is formed of a ceramic material and the other layer is formed of an electrically conductive material, such as stainless steel. The number of layers determines the total force that can be generated by the piezoelectric bender 34, wherein the force increases in proportion to the number of layers.

An electrical power connection (not shown) is provided by a conventional printed circuit board edge connector 72. The piezoelectric bender 34 is connected to the printed circuit board edge connector 72 to provide electrical power for the operation of the device 10. The piezoelectric bender 34 is capable of movement toward or away from the impacting member 36 in relation to the polarity and level of the applied voltage. The amplitude of the movement or deflection of the free end 66 of the bender 34 increases in response to increases in the level of applied voltage, such that the fluid control device 10, or the particular valve thereof, can be used as a "throttle" valve by varying the level of applied voltage.

The piezoelectric bender 34 is secured to the spacer plate 64 by a mounting clip 74. The bender 34 is positioned with the free end 66 projecting over the impacting structure 36. A pair of depending projections 76 and 78 are formed on the mounting clip 74. A conductive shim 80 is used to make the total thickness of the shim and piezoelectric bender equal the proper thickness to mate with printed circuit board connector 72. The projections 76 and 78 are located to be slidably received in a passage 82 and a socket 84 of the spacer plate 64 respectively so that each bender 34 is located at the desired angle to and at the desired distance from the impacting-structure 36. The socket 84 can be formed by a single groove located on the spacer plate 64 perpendicular to the axis of the bender 34. The clip 74 is adjusted by means of set screws 86 and 88 threaded through suitable pairs of threaded passageways 90 and 92 respectively. The set screws 86 and 88 function to effect the movement of the mounting clip 74 pivotably at a shoulder 94 of the spacer plate 64. A set screw 96, is located in a threaded passageway 98 in the housing 12 such that the set screw 96 in conjunction with the set screws 86 and 88 will effect the clamping of the piezoelectric bender 34 in the predetermined position. When it is desired to change the angular position of the bender 34, the set screws 86, 88, and 96 are simply loosened and/or tightened the amount necessary to effect a new angular position. Alternatively, the bender 34 can be positioned as desired and then bonded in place.

The flow control device 10 can be arranged such that it is normally in either the closed condition, where fluid flow is cut off, or in the open position where fluid is allowed to flow through the device 10. FIGS. 1 and 3 illustrate the flow control device 10 in the normally closed condition. When the electrical power is deactivated, the piezoelectric bender 34 is mechanically deflected, holding the impacting structure 36 against the membrane 20 to force the membrane 20 against the valve seat 32. Thus, a fluid-tight seal is maintained between the membrane 20 and the valve seat 32. When electrical power is supplied to the device 10, the free end 66 of the piezoelectric bender 34 is caused to deflect away from the impacting structure 36, thereby providing a path for fluid flow from the chamber 24 to the fluid outlet 16.

FIG. 2 illustrates the fluid control device 10 in the normally open condition wherein the piezoelectric bender 34 is arranged to provide an open path for fluid flow from the chamber 26, to the fluid outlet port 16. In this case, when electrical power is supped to the device 10 the free end 66 of the piezoelectric bender 34 is caused to deflect toward the impacting structure 36, thereby throttling the flow of fluid through the device 10. At a predetermined level of applied voltage, the free end 66 of the piezoelectric bender 34 moves the impacting member 36 against the membrane 20, such that the membrane 20 exerts a fluid-tight sealing force on the valve seat 32 and cuts off fluid flow from the chamber 24. The polarity of the electrical connection determines the direction of movement of the deflectable portion of the piezoelectric bender 34.

Referring to FIG. 4, the device 10 is illustrated having a plural fluid control arrangement, here five in number, each having an individual piezoelectric bender 34 (not shown). The channel 28 is in communication with the fluid inlet port 14 via a connecting passageway 100.

The membrane 20 is seen to be positioned on the housing surface 42 so that it is resiliently movable in the vertical plane relative to the valve seats 32.

A raised rib or continuous line portion of substantially uniform height is represented in FIG. 4 as a plurality of rings 102 and a linking structure or webbing 104 defined by a gasket screen, identified generally by the reference numeral 106. Alternatively, the raised rib portion contemplated by the invention can be provided by forming the rib integral with the surface 42 of the housing 12 or the cover plate 18, or by molding the membrane 20 with a raised rib. The necessary criteria is that the raised rib portion substantially surround and be spaced away from the chamber 24 and any fluid carrying channel which is open to the surface 42 such that sealing will occur between the membrane 20 and the surface 42.

When the housing 12 and the cover plate 18 are secured together the membrane 20 is placed under compression and the raised rib portion or rings 102 embed into the membrane 20. The lateral flow and resultant bulging of the membrane 20 over the valve seat 32 is a funtion of the volume of membrane compressed. The raised rib portion functions to localize the compressive force applied to the membrane 20 to achieve a minimum displacement of laterally flowing membrane material. Further, the rings 20 are sized such that they can be located on the membrane 20 as far away from the valve seat 32 as possible without interfering with the functioning of an adjacent valve seat while, at the same time, not so far away that the valving function at the valve seat 32 is diminished. In this manner an area is provided to accomodate the small amount of flowing material from the compressed portion of the sealing membrane 20 to substantially prevent change in the thickness or a bulging of the membrane 20 that extends over the valve seat 32. This prevents a change in the deflection characteristics of the membrane 20, or its dynamic response characteristics, and also prevents an unnecessary increase in the force which must be applied to perform the valving function, i.e., the uncovering and/or covering of the valve seat 32. Thus, the force which is required to be applied by the respective piezoelectric bender 34 to the respective impacting structure 36 to perform the valving function is maintained within the capacity of the bender 34.

Referring to FIGS. 1-3, a line seal 108 is formed at the surface 42 by the ring 102. Similarly, a line seal 110 is formed at surface 42 by the linking structure or web 104. Fluid entering the device 10 will flow through the channel 28 to the connecting channel 30, and from there pass into the chamber 24. The line seals 108 and 110 function to confine the fluid flow within this pathway while substantially preventing change in the characteristics of the membrane 20 that would interfere with its valving function. When the raised rib structure is provided by the gasket screen 106 an alignment structure is provided to align the gasket screen 106 in relation to the valve seat 32. The alignment structure can be provided by a plurality of dowel pins 112 (best seen in FIG. 4) and screws 22 located for alignment with conforming dowel pins and screws in the housing 12 and the cover plate 18. Preferably the alignment structure will locate the gasket screen within a 0.003 inch tolerance of the required placement position.

Referring to FIG. 5, the gasket screen 106 is seen to have a longitudinal row of the rings 102 formed interior to a frame or border 114 and connected to the frame 114 by the linking structure or webs 104. The rings are formed such that each chamber 24 has a corresponding ring 102. The center of the ring is located to be aligned with the center of the respective chamber 24 and the valve seat 32. The diameter of the ring 102 is selected so that each ring is as far away as possible from the valve seat 32 to minimize the effect of the greatly reduced lateral flow of the material of the membrane 20. The frame 114 is located so as not to impinge on the membrane 20 when the device 10 is assembled.

When compression is applied the thickness of the membrane 20 will generally be reduced between 30 to 50% of its non-compressed thickness but only coextensive with that portion of the membrane 20 addressed by the gasket screen 106. Thus, the compressive force is localized, limited to those areas below the rings 102 and the linking structure or webs 104.

The thickness of the gasket screen 106 is preferably between 0.004 and 0.008 inches and determines the height of the raised rib portion within that range. The thickness of the gasket screen 106 in excess of the compression of the membrane 20 will allow a void (not shown) to form between the membrane 20 and the cover plate 18 into which excess membrane material that is displaced by compression can flow.

Dowel pins openings 116 and screw openings 118 are provided to align the gasket screen 106 in relation to the valve seats 32. The alignment structure is critical to the proper functioning of the gasket screen 106 since only that portion of the membrane 20 that is addressed by the rings 102 and the linking structure or web 104 are to be compressed.

Referring to FIG. 6, a gasket shim 120 is provided to limit the compression of the rings 102 and the linking structure or web 104 into the membrane 20. The gasket shim 120 has a frame or border 122 that substantially mirrors the border 114 of the gasket screen 106. Both borders 114 and 122 are positioned outside the boundaries of the membrane 20 with the membrane 20 located interior to and spaced away from the border 122.

The thickness of the gasket shim 120 is selected such that it is less in thickness than the membrane 20 by the distance that the gasket screen 106 is allowed to compress into the membrane 20. Once the thickness of the gasket screen 106 is selected it can be employed for all compression values and the thickness of the gasket shim 120 can be varried from 0.003 to 0.009 inches to vary the compression of the membrane 20.

The thickness of the gasket shim 120 relative to the membrane 20 is critical. The gasket shim 120 is less in thickness than the membrane 20 and is intended to limit the compression that is applied by the raised rib portions of the gasket screen 106. An alignment structure such as dowel openings 124 and sorew openings 126 are provided to align the gasket shim 120 with the gasket screen 106 and locate the gasket shim 120 surrounding but apart from the membrane 20.

Alternative embodiments of the invention are illustrated in FIGS. 7, 7A and 7B. These embodiments can be provided in lieu of the raised rib portions of the preferred gasket screen 106. In FIG. 7, a raised rib formation 128 is seen to be integral with the surface 42′ of a housing 12′. The raised rib formation 128 surrounds and is spaced apart from the respective chamber 24 as well as any channels (not shown) that open through the surface 42′. In this instance, as well as the other examples where the raised portions are not provided by a gasket screen, a much thicker gasket shim 120′ can be employed to limit compression. The thickness of the gasket shim will be selected to equal the sum of the thickness of such a raised portion and the membrane 20, less the desired thickness of membrane to be compressed.

The raised portion illustrated in FIG. 7A is provided by forming a rib formation 130 integral with the surface 132 of a cover plate 18' rather than on the housing surface 42. When the cover plate 18' is assembled to the housing 12, the rib formation 130 is embedded into the membrane 20 and a seal is effected between the membrane 20 and the surface 42 of the housing 12.

A modified embodiment of the invention illustrated in FIG. 7B employs a membrane 20' having a raised rib 134 with linking structures molded as a part of the membrane. When the membrane of this embodiment is placed under compression, the raised rib 134 and linking structures establish a seal apart from and substantially surrounding the chamber 24.

Modification and variations of the present invention are possible in light of the above teaching. The gasket screen 106 and the gasket shim 120 are preferably made of metal but any suitable material that is capable of withstanding the compressive forces to uniformly compress the membrane 20 can be substituted. The device 10 can be of any number of configurations and can have one or more valve seats to conform to the required work specification. It is therefore to be understood that within the scope of the appended claims, the invention may be practiced otherwise than as specifically described.

What is claimed and desired to be secured by Letters Patent of the United States is:

1. A fluid control device comprising:
   a housing having a housing surface;
   a cover plate having a cover surface, said cover plate secured to said housing with said cover surface overlying said housing surface;
   at least one chamber located in said housing and having an opening through said housing surface, said chamber in communication with an inlet port such that fluid can flow from said inlet port to said chamber;
   a valve seat located in said chamber, said valve seat having an opening therethrough in substantially the same plane as said housing surface wherein said valve seat opening is in communication with a fluid outlet port to allow fluid to flow from said chamber to said outlet port;
   a sealing membrane of resilient material, said membrane interposed between said surfaces under compression to seal said chamber and provide a valving function relative to said valve seat;
   raised rib means interposed between said surfaces for securing said membrane such that compressive forces are defined by said rib means to a limited area of said membrane apart from and surrounding said chamber to minimize lateral flow of said membrane and substantially prevent change in the thickness of said membrane over said chamber;
   means for limiting said compressive forces of said raised rib means impinging on said membrane, separate and spaced from said membrane and interposed between said surfaces; and
   impacting means for stopping and starting the flow of fluid through said valve seat opening by moving said membrane against said valve seat opening to stop the flow of fluid and releasing said membrane to allow the flow of fluid through the fluid flow control device.

2. The fluid flow control device as defined in claim 1 wherein said raised rib means include a gasket screen interposed between said cover surface and said membrane.

3. The fluid flow control device as defined in claim 2 wherein said limiting means include a gasket shim interposed between said gasket screen and said housing surface, said gasket shim configured to be spaced away from and surround said chamber for limiting compressive forces impinging on said membrane.

4. The fluid flow control device as defined in claim 3 further including alignment means for aligning said gasket screen and said gasket shim relative to said chamber.

5. The fluid flow control device as defined in claim 4 wherein said alignment means include dowel pins located on said housing surface and dowel pin openings in said gasket screen and gasket shim such that said dowel pins cooperate with said dowel pin openings for aligning said gasket screen and said gasket shim relative to said chamber.

6. The fluid flow control device as defined in claim 1 wherein said raised rib means are formed integral with said housing surface.

7. The fluid flow control device as defined in claim 1 wherein said raised rib means are formed integral with said cover surface.

8. The fluid flow control device as defined in claim 1 wherein said raised rib means are formed integral with said sealing membrane.

9. The fluid flow control device as defined in claim 1 further having at least one opening in said coverplate to accommodate a number of impacting means equal to said valve seats; and
   actuating means for moving said impacting means to obtain a desired level of fluid flow.

10. The fluid flow control device as defined in claim 8 wherein said actuating means include piezoelectric benders.

11. The fluid flow control device as defined in claim 1 further including a connecting channel located between at least two of said chambers, said connecting channel having an opening through said housing surface, said sealing membrane further configured to seal said opening of said channel, and said raised rib means further configured for containing fluid in said channel as the fluid flows between said chambers.

12. The fluid flow control device as defined in claim 1 wherein said raised rib means include a pair of members, an upper member and a lower member;
   said lower member seated on said housing surface and configured to surround and be spaced apart from said membrane, said lower member being of substantially uniform thickness to limit compressive forces impinging on said membrane; and
   said upper member superimposed in registry with said lower member, said upper member having a border and at least one ring located interior to and coplanar with said border, said upper member further having linking means for securing said ring to said border such that when the fluid flow control device is assembled said ring is spaced away from and surrounding said valve chamber opening to impact on limited areas of said membrane and localize compressive forces along a narrow band defined by said ring.

13. The fluid flow control device as defined in claim 12 wherein said members are metal.

14. The fluid flow control device as defined in claim 12 further including alignment means for positioning said members relative to said chamber.

15. The fluid flow control device as defined in claim 14 wherein said alignment means include dowel pins located on said housing surface and dowel pin openings located in said members such that said dowel pins cooperate with said dowel pin openings to align said members relative to said chamber.

16. A method of forming a seal surrounding an area on one surface of adjacent surfaces having a sealing membrane of resilient material capable of lateral flow located therebetween, and secured together comprising:
   compressing said membrane along a narrow band surrounding said area to minimize lateral flow of said resilient material and substantially prevent change in the thickness of said membrane within said area and limiting said compressing by forming a shim between said adjacent surfaces, spaced from said membrane.

17. The method as defined in claim 16 further including providing a gasket screen for compressing said membrane.

18. The method as defined in claim 16 further including providing a membrane valve formed by cooperation of said membrane and a valve seat located in a valve chamber opening in substantially the same plane as one of said surfaces.

19. The method as defined in claim 18 further including forming said raised rib means from a pair of members, a lower member and an upper member;
   said lower member seated on a housing surface having said valve chamber opening therethrough, said lower member configured to surround and be spaced apart from said membrane, said lower member further being of substantially uniform thickness to limit compressive forces impinging on said membrane; and
   said upper member superimposed in registry with said lower member, said upper member having a border and at least one ring located interior to and coplanar with said border and a linking means for connecting said ring to said border,
   positioning said ring between said surfaces such that when the fluid flow control device is assembled, said ring is spaced away from and surrounding said valve chamber opening for impacting on limited areas of said membrane to localize compressive forces along a narrow band defined by said ring.

20. The method as defined in claim 19 further including forming said members from metal.

21. The method as defined in claim 19 further including aligning said members relative to said surfaces by alignment means.

22. The method as defined in claim 21 including forming said alignment means from dowel pins located on at least one of said surfaces and dowel pin openings located in said raised rib means such that said dowel pins cooperate with said dowel pin openings to align said members relative to said surfaces.

23. An improved fluid flow, control device having at least one chamber formed in a first member and having an opening through a first surface of said first member and a second surface of a second member overlying said first surface, said members being secured together under compression, a valve seat located in said chamber, said valve seat having an opening therethrough in substantially the same plane as said first surface, a sealing membrane of resilient material interposed between said members to seal said members and chamber, said membrane having a valving function relative to said valve seat and said resilient material capable of lateral flow under compression, wherein the improvement comprises:
   raised rib means interposed between one of said first and second surfaces and said membrane for impacting limited areas of said membrane to localize compressive force along a narrow band along said first surface apart from and surrounding said chamber to minimize lateral flow of said membrane and substantially prevent change in the thickness of said membrane over said chamber; and
   means for limiting said compressive forces of said raised rib means impinging on said membrane, separate and spaced from said membrane and interposed between said surfaces.

24. The improvement defined in claim 23 wherein said raised rib means include a pair of members, a lower member and an upper member;
   said lower member seated on a housing surface having said valve chamber opening therethrough, said lower member configured to surround and be spaced apart from said membrane, said lower member further being of substantially uniform thickness to limit compressive forces impinging on said membrane; and
   said upper member superimposed in registry with said lower member, said upper member having a border and at least one ring located interior to and coplanar with said border, said upper member further having linking means for securing said ring to said border such that when the fluid flow control device is assembled, said ring is spaced away from and substantially surrounding said valve chamber opening for impacting on limited areas of said membrane to localize compressive forces along a narrow band defined by said ring.

25. The improvement as defined in claim 24 wherein said members are metal.

26. The improvement as defined in claim 24 further including alignment means for positioning said members relative to said surfaces.

27. The improvement as defined in claim 26 wherein said alignment means include dowel pins located on at least one of said surfaces and dowel pin openings located in said raised rib means such that said dowel pins cooperate with said dowel pin openings to position said members relative to said surfaces.

* * * * *